United States Patent [19]
Fond et al.

[11] Patent Number: 5,603,254
[45] Date of Patent: Feb. 18, 1997

[54] APPARATUS FOR EXTRACTING SUBSTANCES CONTAINED IN SEALED PLIANT BAGS

[75] Inventors: Olivier Fond, Kobe, Japan; Petr Masek, Granges, Switzerland

[73] Assignee: Nestec S.A., Vevey, Switzerland

[21] Appl. No.: 362,597

[22] PCT Filed: Mar. 27, 1994

[86] PCT No.: PCT/CH94/00099

§ 371 Date: Mar. 16, 1995

§ 102(e) Date: Mar. 16, 1995

[87] PCT Pub. No.: WO94/27482

PCT Pub. Date: Dec. 8, 1994

[30] Foreign Application Priority Data

Jun. 2, 1993 [CH] Switzerland ............................ 1624/93
Jun. 2, 1993 [CH] Switzerland ............................ 1625/93

[51] Int. Cl.⁶ .............................. A47J 31/24; A47J 31/14
[52] U.S. Cl. ................................ 99/295; 99/300; 426/433
[58] Field of Search ............................ 99/295, 279, 298, 99/299, 300, 302 R, 304, 307, 323; 426/433

[56] References Cited

U.S. PATENT DOCUMENTS

| | | | |
|---|---|---|---|
| 3,347,151 | 10/1967 | Ronalds | 99/295 |
| 3,387,553 | 6/1968 | Tavera . | |
| 3,403,617 | 10/1968 | Lampe . | |
| 3,470,812 | 10/1969 | Levinson . | |
| 3,607,297 | 9/1971 | Fasano | 99/295 |
| 4,738,378 | 4/1988 | Oakley et al. . | |
| 5,242,702 | 9/1993 | Fond | 426/433 |
| 5,325,765 | 7/1994 | Sylvan | 426/433 |
| 5,402,707 | 4/1995 | Fond et al. . | |
| 5,472,719 | 12/1995 | Favre | 426/433 |

FOREIGN PATENT DOCUMENTS

| | | |
|---|---|---|
| 21217624 | 1/1984 | United Kingdom . |
| 22554942 | 11/1992 | United Kingdom . |

Primary Examiner—Robert W. Jenkins
Attorney, Agent, or Firm—Vogt & O'Donnell, LLP

[57] ABSTRACT

A bag-holder and an extraction machine for enabling extraction of a substance for preparation of a beverage contained in a pliant bag having at least one linear edge weld. The bag-holder has a housing configured to provide a cavity for containing the bag and an area which provides a grid of raised and indented elements and flow holes, the grid area providing for tearing the bag and for flow of extract from the housing during extraction. The bag-holder also has provision for securing the edge weld of the bag to keep the bag in the holder. The bag-holder also contains a bore in the area of the outflow grid for accepting a hollowed needle therethrough for penetrating into a bag for introducing extraction fluid into the bag and wherein the needle, during extraction, extends from an extraction machine which also has a part for, upon placement of the bag-holder together with the extraction machine, enabling sealing the part and the holder.

13 Claims, 3 Drawing Sheets

APPARATUS FOR EXTRACTING SUBSTANCES CONTAINED IN SEALED PLIANT BAGS

The present invention relates to provision of a substance for preparation of a beverage contained in a sealed pliant bag, to preparation of a beverage by extracting the substance while contained in the bag and to apparatus for carrying out the method including an holder member for holding the bag and an extraction machine for providing means for effecting extraction.

BACKGROUND OF THE INVENTION

The use of premetered and prepackaged portions of ground coffee for the preparation of coffee of the filter type (percolation under atmospheric pressure and under just the effect of the column of hot water placed above the bed of coffee) or of the expresso type (extraction pressure above 0.5 bar and up to 20 bar) has the advantage of making the operations of preparing the coffee easier, while guaranteeing a relatively constant quality of the product.

Currently, these portions are in two main forms. According to a first version, the portion described in U.K. Patent Application Publication No. GB 2,121,762 consists of a sachet package with a nozzle intended to be perforated in order to enable liquid to be injected into the package. The liquid, after extraction through the bed of coffee, drains away through the tear, automatically produced under the effect of the pressure or by mechanically cutting, in the bottom of the package.

The GB '762 sachet package, requiring the presence of a nozzle, is complicated and expensive to produce and to use. The extraction device is also very complicated and requires the device for introducing the aqueous fluid to interact in a sealed manner with the package.

According to a second version, described in PCT Patent Application Publication No. WO 92/0775, the portion consists of a sealed cartridge which is opened by an extraction device under the effect of the introduction of the extraction fluid after being deformed against sharp points. This cartridge consisting of a sealed envelope forming a side wall and two walls of which one constitutes the bottom of the cartridge and the other seals off the opposite end of the cartridge, has the drawback of employing various packaging materials, some of them being sufficiently thick to impart semi-rigidity to them, and can be used only in one sense with an extraction device perfectly matched to the capsule and to its arrangement. This device comprises, towards the upper face of the cartridge, a device for introducing water and, towards the lower face, a device for perforating the bottom of the cartridge, the cartridge having to be clamped, in a perfectly sealed manner, around its entire edge between the two removable parts of the extraction device.

SUMMARY OF THE INVENTION

The object of the present invention is to provide a method and apparatus devices which permit extraction from a sealed pliant bag, ready for use directly and without a nozzle for introducing the fluid, and not requiring perfect sealing, either between the device for introducing the fluid and the bag or between the two interacting parts of the extraction device.

The present invention provides a bag-holder which comprises a handle, an open housing for the bag and an outflow area for flow of the extracted beverage from the holder, the housing comprising means for securing a part of the bag in the holder, and the outflow area comprises a grid of raised and indented elements to provide for tearing of a bag containing a substance to be extracted for preparation of a beverage and comprises flow holes for passage of extract from the housing.

The present invention also provides an extraction machine which comprises at least one needle for injecting extraction fluid into a bag containing a substance to be extracted for preparation of a beverage. In the context of association with the bag-holder described above, the at least one needle is provided at a position for passing through the bag-holder housing for penetrating into a bag held by the bag-holder in the region of the outflow grid, and the machine also comprises a complementary part which enables, upon placing the bag-holder in place, sealing with the bag-holder housing.

The invention provides to a method of extraction from sealed pliant bags containing at least one substance for the preparation of a beverage, the said bag having at least one linear weld, in which method, the bag is placed in a bag-holder which includes a handle for gripping and a housing for the said bag, this bag is clamped in the region of its weld area, the bag/bag-holder is placed in an extraction machine, the said bag is perforated at its lower part above the weld area with a needle, a mixture of air and water at a pressure of between 0.5 and 10 bar is injected into the upper part of the bag with the aid of the said needle, at least one of the two lower faces of the bag is torn against raised and indented areas of an extraction device under the effect of the pressure, and then the extract, which has passed right through the bed of the substance via the orifices made in the lower part of the bag, is collected.

DETAILED DESCRIPTION OF THE INVENTION

In the context of the present invention, the concept of an upper and lower part of the bag is defined only once the bag is in place in the extraction device. The bag is normally arranged in a vertical position. Nevertheless, as a variant, the bag can be arranged in an oblique or horizontal position. In the latter case, the part called the lower part of the bag is considered as the area where the bag is clamped by the clamp of the bag-holder and the injection needle penetrates, whereas the part called the upper part corresponds to the opposite area. The bag can be correctly extracted in the horizontal position, provided that the extraction fluid penetrates at one end of the bed of the substance to be extracted and reemerges at its opposite end, and provided that the extraction head loss is markedly greater than the thickness of the bed of coffee (5 to 100 m of extraction head loss against 0.5 to 10 cm of thickness of the bed, a factor of 1000).

The method will be better understood from the description of its successive steps which can be carried out, in the particular case of its use for coffee, using commercial coffee machines which include the means, as from the construction or by addition of adaptors, for holding the bag, injecting water into the bag and collecting the coffee extract.

The description given below by way of example of application to roasted ground coffee is not, however, limiting, the method being applicable to any product or mixture of products contained in a pliant bag, such as tea, instant coffee, a mixture of ground coffee and instant coffee, a chocolate-containing product or a dehydrated foodstuff, these being intended for obtaining beverages or foods in infusion form.

In a first step, the bag is placed in the bag-holder. According to a first complementary arrangement, the bag-holder includes a clamp, which can be operated by known means which close up on the lower weld of the bag. The bag is therefore firmly kept in position, i.e. secured in the bag-holder.

According to a second arrangement, in particular if the bag has been vacuum-sealed, the shape of the bag is perfectly defined. It is therefore not necessary to fix it to the bag-holder, but rather to introduce it into a cavity in the bag-holder corresponding to the shape and size of the said bag.

In a second step, the bag-holder and the bag are placed in the extraction machine. Simultaneously, during this operation, the bag is perforated by the water-injection needle at its base just above its lower weld. The needle penetrates over its entire length into the bag up to its upper part above the bed of the substance to be extracted.

According to a variant of this method, the perforation by the water-injection needle can be performed after the final positioning of the bag-holder in the machine.

According to another variant, particularly in the case of large bags, several water-injection needles, arranged in parallel, can be employed.

In a third step, the water, which may or may not be mixed with air, is injected under a pressure of 0.5 to 10 bar into the bag through the water-injection needle. This extraction fluid is thus directed towards the top of the bag and rains down on top of the bed of the substance to be extracted the pressure rises in the bag and its faces are pressed, by deformation, against the walls of an extraction device and particularly against the specific raised and indented elements of the said device, these elements being intended to enable the tears to be made in the material of the said bag. In addition, this step ensures that the coffee is prewetted before extraction.

The air is that present in the pipes of the said machine, this mixing with the water upon initiating the extraction process.

Under some conditions, depending on the machines employed and the initial heating temperature, the first water fractions may be in the form of steam.

According to a variant of the method, a pause period, with the injection of the extraction fluid stopped, may be observed between the third and fourth steps.

In a fourth step, according to a first variant, the tears, which were initiated on putting the bag in place in the bag-holder and closing the clamp or on putting the bag/bag-holder assembly in place in the extraction device, may be enlarged under the effect of the material pressing against the projecting elements on pressurizing the bag.

According to a second variant, the tears are made only on the rise in pressure inside the bag. Since the material constituting the faces of the bag reaches the rupture stress, the tear is initiated at the location of the projecting raised parts and/or in the indented parts, that is the cavities (hollows) formed between the said raised parts. Depending on the shape of the raised part, the tear can also extend into the two previously-mentioned areas.

The parts of the extraction faces thus fractured are applied against the raised part with the effect that the openings made are enlarged, favouring the subsequent outflow of the extraction fluid, but in such a way that no dispersion of material takes place outside the bag. The internal pressure of the bag drops partially, but this momentary decompression is limited since the fluid flow escaping from the bag is throttled, both by the small gaps formed by the lips of the torn material of the extraction face bearing on the raised part and by the outflow orifices made in the raised element. The outflow is thus perfectly controlled, excluding especially any inopportune movement of the solid phase of the contents of the bag which could obstruct the outflow orifices and subsequently cause a problem with the uniformity and reproducibility of the extraction process. According to the terminology employed in Swiss patent CH 668,545 relating to a cartridge with a pre-weakened cover, this step of opening the bag may be considered as a step of aerating the powdery material.

According to a variant of the method, a pause period, with injection of the extraction fluid stopped may be observed between the fourth and fifth steps.

In a fifth step, the coffee is extracted under a pressure of 0.5 to 10 bar, this pressure being intentionally and essentially related to the head loss across the bed of wet, and for this very reason compacted coffee. This is the extraction phase. The coffee extract ends up passing between the torn and deformed parts of the extraction face of the bag right up to the outflow orifices, since these torn parts cannot be pressed in a perfectly sealed manner against the raised part because of a certain relative rigidity due to them being quite small.

The number of tears made in the extraction faces is preferably between 5 and 200. These tears may be made on one and/or other of the two lower faces of the bag depending on whether the raised and indented elements are arranged on the fixed part and/or the removable part (clamp) of the bag-holder.

The extract can also escape via the tears produced around the area of penetration of the water-injection needle into the bag.

Complementary openings in the extraction faces may possibly be produced when the extraction pressure reaches high values.

In a sixth step, the bag-holder is released and the bag removed, for example simply by inverting the bag-holder and opening the clamp.

The bag used for the implementation of the method according to the invention can be a sealed pliant bag consisting of a single packaging material and directly made from a single sheet of this material and shaped in order to provide a volume which makes it possible to contain the said substance and which is greater in volume compared to that occupied by the said substance, the said bag being intended to be used as it is in the intended extraction device and including at least one linear weld.

By sealed, is meant that the bag is impervious or practically impervious, to oxygen and to water vapour. By useable as it is, is meant that such a bag is directly ready for use and requires no prior preparation before putting it into the extraction system according to the invention. In particular, it is not necessary to perform an intentional operation of opening or of tearing the bag before it is put into the extraction device. Its advantage is that it provides many functions during the various steps in its use. Firstly, it provides the function of packaging and of protecting a metered amount of the substance against oxygen or water during the period of storage, then it provides the function of an extraction and filtering reactor since the substance contained in it is directly extracted by the extraction fluid right inside the bag without the non-extractable fractions escaping and, finally, after extraction, it provides the function of a package for the residues of the substance, thus preventing any soiling through dispersion of the latter.

Such a bag is manufactured using a known and mastered technology. Its novelty lies in its contents, the nature of its materials and the extent to which it is filled so that, in being associated with a specific extraction device, this package has many functions which go well beyond just the packaging function.

The bag is manufactured directly from a single sheet of the packaging material, which sheet is folded, welded and cut in varying places, after having metered the powdery substance in question into it.

The bag has one longitudinal weld and two transverse welds. To manufacture such a bag, the sheet is wound around a metering tube via which the substance is conveyed. The longitudinal weld of the bag is made around this tube. The lower weld is produced, the substance is introduced into the bag and then the upper weld is made.

By longitudinal and transverse welds are meant, in the present description, two welds which are perpendicular to each other, as will be apparent in connection with the drawing figures.

In a first arrangement, the two transverse welds are arranged in two perpendicular planes. In this case, the bag produced is in the form of a tetrahedron.

In a second arrangement, the two transverse welds are made in the same plane. The bag then has a shape similar to a parallelepipeded, possibly with various versions, for example folding of one or other of the transverse welds which are turned down onto the upper and/or lower faces after welding, or folding of the sheet by pushing in the corners after welding.

The bag is filled with at least one powdery substance for the preparation of a beverage. This substance is preferably roasted and ground coffee, but it can also be tea, instant coffee, a mixture of ground coffee and instant coffee, a chocolate-containing product, or any other dehydrated comestible substance. Several substances may be placed in the said bag, either mixed together or, if necessary, separated by a porous wall.

In one particular arrangement, the bag may have an internal pressure greater than atmospheric pressure, being between 1000 and 1800 mbar. This overpressure has the effect of increasing the apparent volume of the bag, enables the desired shape of the bag to be maintained, makes it easier to grip the bag and makes it easier to insert it into and use it in, the extraction device.

This overpressure can be produced directly on manufacturing the bag or achieved subsequently, for example itself using a substance which releases gas, such as freshly roasted and ground coffee which slowly releases $CO_2$.

According to another particular arrangement, if the keeping of the product is critical, even though the method of filling is then complicated and expensive, the bag can be sealed after having been exposed to a vacuum. Such a bag has a certain rigidity, which then contributes to maintaining its initial shape and to making it easier to handle, as well as a minimum overall size.

According to a particular arrangement of the bag, the substance to be extracted may be compacted, being in the form of one or more pieces.

According to the preferred configuration, the bag is made of materials which are virtually or completely impervious to gas, such as oxygen, and to water. The bag, therefore called sealed, is directly ready to use and requires no prior preparation before putting it into the extraction system provided for its purpose.

In this preferred configuration, the sheet may consist of pliant material, such as aluminium having a thickness of 20 to 50 μm or a plastic such as PET polyethyleneterephthlate, in both cases with a weldable layer.

Preferably, the sheet will be made of a pliant multilayer material. The following combination of materials is recommended:

outer layer: PET (normal, woven or non-woven), PE, PP, PA, PS (respectively, polyethylene, polypropylene, polyamide, polystyrene) or paper;

oxygen and /or water-vapour barrier layer: aluminium having a thickness of 5 to 30 μm, EVOH, PVDC, or PVA (respectively, copolymer of ethylene and vinyl alcohol, polyvinylidene chloride, or polyvinyl alcohol), or a layer of silicon oxide, or metallization;

inner layer: heat-weldable plastic, preferably PE or PP or PS.

The following combinations may, for example, be envisaged: PET-EVOH-PE, paper-aluminium-PE, PET-silicon oxide-PET-PP or PET-metallization-PP.

According to a second configuration, the bag may be produced with a filter paper or woven or non-woven plastic fibres. The bag, then called an unsealed bag, must be packaged over in an additional envelope impervious to oxygen. Before using the bag, it must be removed from its protective package and then employed as it is in the extraction device specially provided for its purpose.

The faces of the bag have lengths of between 3 and 25 cm, preferably between 4 and 15 cm, the thickness of the bag being between 0.5 and 10 cm, depending on the type of bag produced and its internal pressure, preferably between 1 and 5 cm.

The effective level of filling of the volume of the bag with the substance is normally between 10 and 70%. This effective level of filling may be markedly less than the apparent level of filling since the substance contained is itself highly porous and has a large free volume between its particles.

A low effective level of filling of the bag is also observed if the bag has a high internal pressure. In the case in which the bag has been vacuum-sealed, the level of filling is much higher.

The metered amount of substance to be extracted, contained in the bag, is between 5 and 300 g, preferably between 6 and 30 g.

When the powdery substance is prone to oxidize, the manufacturing operations may be performed under the protection of a stream of oxygen-free inert gas, for example under nitrogen.

In the context of the apparatus of the present invention, the bag-holder is put in place and kept in the machine by known mechanical means such as, for example, tongues interacting with grooves.

The means for keeping the bag in the bag-holder may be represented by a clamp, which can be operated by means of a lever using one finger (or trigger) and provided with a spring, which grips the lower part of the bag tightly, for example the area of the lower weld of the said bag. The force clamping the bag must be such that the bag does not move when it is perforated by the water-injection needle and subsequently when pressurized water is injected into the bag.

The raised and indented elements on an outflow grid, which are intended to provide the tearing of the material of the said bag in its lower part so as to enable the extract to be drained away, can be of the same kind as those described in the above-noted PCT Patent Application Publication No. WO 94/02059. These elements may also be of the same kind as those described in the U.S. Pat. No. 3,403,617.

The raised and indented elements on an outflow grid can be arranged on one and/or other of the faces of the clamp for clamping the bag onto the bag-holder.

The needle for injecting the extraction fluid is followed and has a hollow point, possibly bevelled at its end, having an outside diameter of 1.5 to 5 mm, the diameter possibly varying over the length of the needle. Its length is adapted to the size of the bag so that it penetrates at the base of the latter and so that it emerges in its upper part, above the bed of the substance to be extracted. According to an embodiment variant of this hollow needle, it may have, in its terminal part, various orifices providing outlet for the water at varying angles.

According to a particular variant, in the case, for example, of large bags, several water-injection needles, arranged in parallel, may be employed.

According to a first embodiment variant of the device, the injection needle may be integral with the bag-holder. In this case, it is removable. It is then put into position through the bag only once the bag is in place in the bag-holder.

According to a second embodiment variant of the device, the injection needle is integral with the extraction machine. It may be fixed or removable. In the latter case, it must be put into the extraction position, that is to say partly inserted into the bag, during an operation subsequent to putting the bag-holder in the machine.

According to a particular variant of the extraction device, the bag-holder and the complementary part of the machine possess on their borders, seals intended to produce a sealed cavity.

The extract which is released from the bag during extraction is directed towards a container by means of outflow ducts and channels provided in the region of the bag-holder and/or of the basic extraction machine.

In order to protect the injection needle which is quite slender and thereby protect the user of the machine against any injury from this needle, it is possible to provide in the machine, in the region of the normal place for the bag-holder, protection members connected to a spring which turn down over the sides when the bag-holder is inserted into its housing. When the bag-holder is out of the machine, these members protect the housing of the bag-holder and, in particular, the injection needle.

The following description of provided with reference to the drawing figures.

DETAILED DESCRIPTION OF THE DRAWING FIGURE

Figure 1:
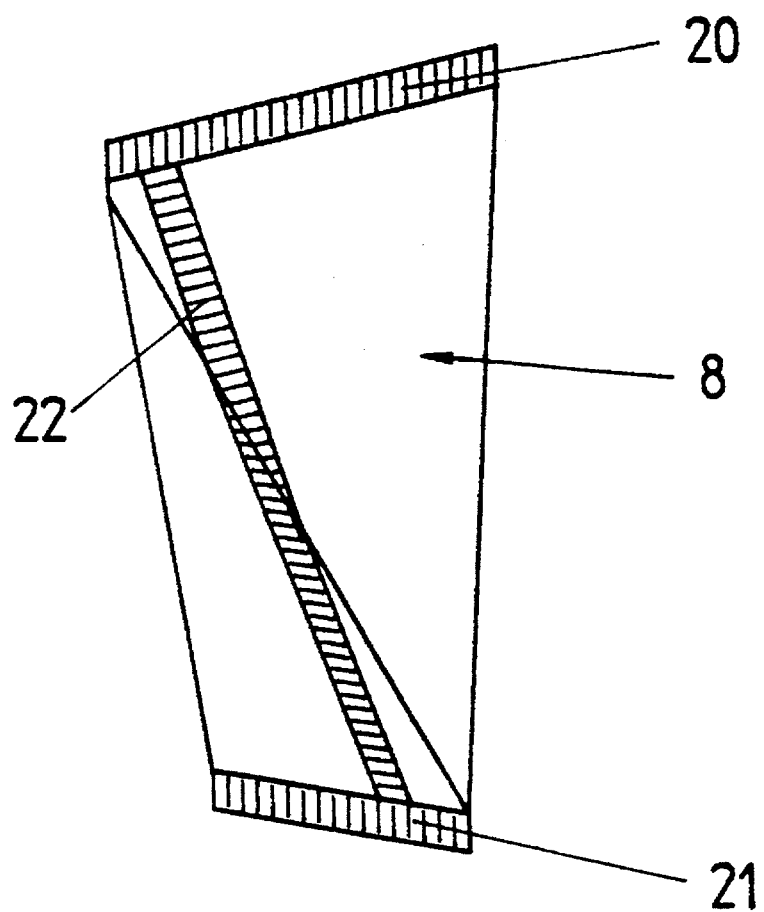
FIG. 1 is a representation of a bag with one longitudinal weld and two transverse welds, the two transverse welds being arranged in a perpendicular plane.

The bag (8), represented in FIG. 1, having two transverse welds (20, 21) arranged in two perpendicular planes and one longitudinal weld (22), has a tetrahedral shape.

Figure 2:
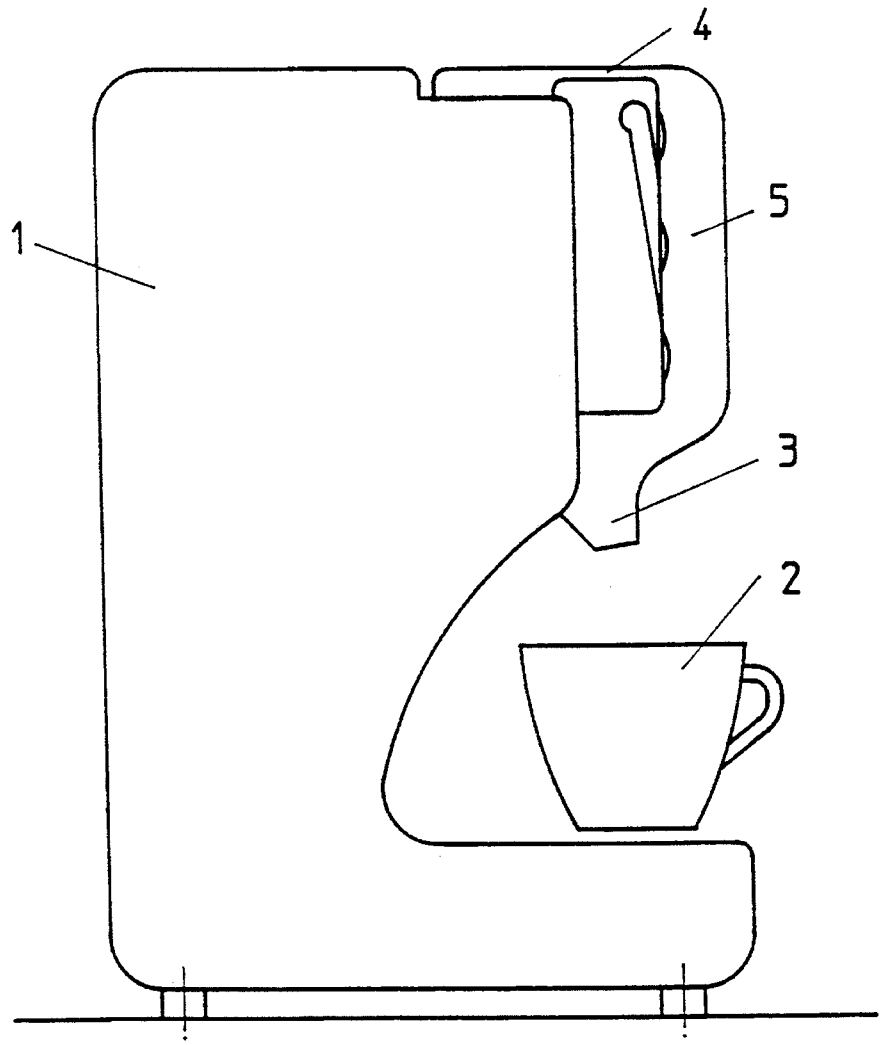
FIG. 2 is a diagrammatic representation of the extraction machine seen from the side.
Figure 3:
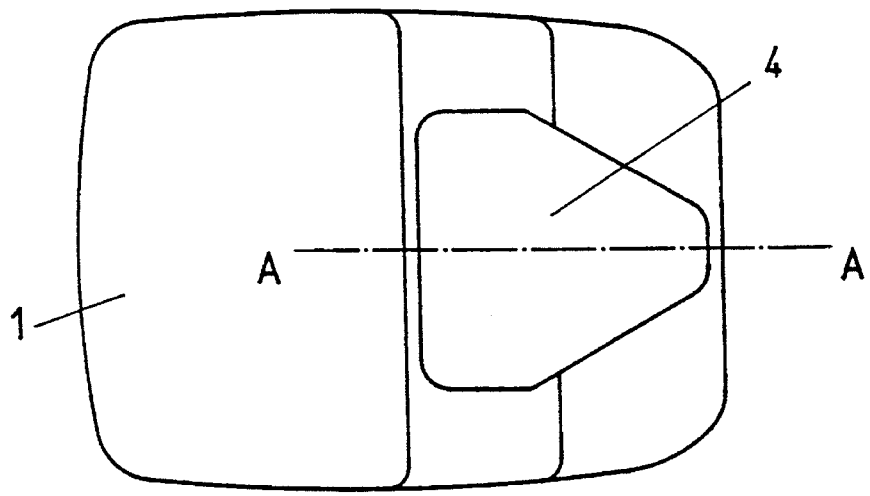
FIG. 3 is a representation of the extraction machine seen from above.

The machine 1, represented in FIGS. 2 and 3 possesses the means (not represented) necessary for heating and injecting, under pressure, the extraction fluid. The extract is collected in a container 2 placed vertically below the outflow spout 3 of the bag-holder 4. The bag-holder 4, which can be handled using a handle 5, is put in place in the extraction machine by means of two symmetrical tongues interacting with two grooves.

Figure 4:
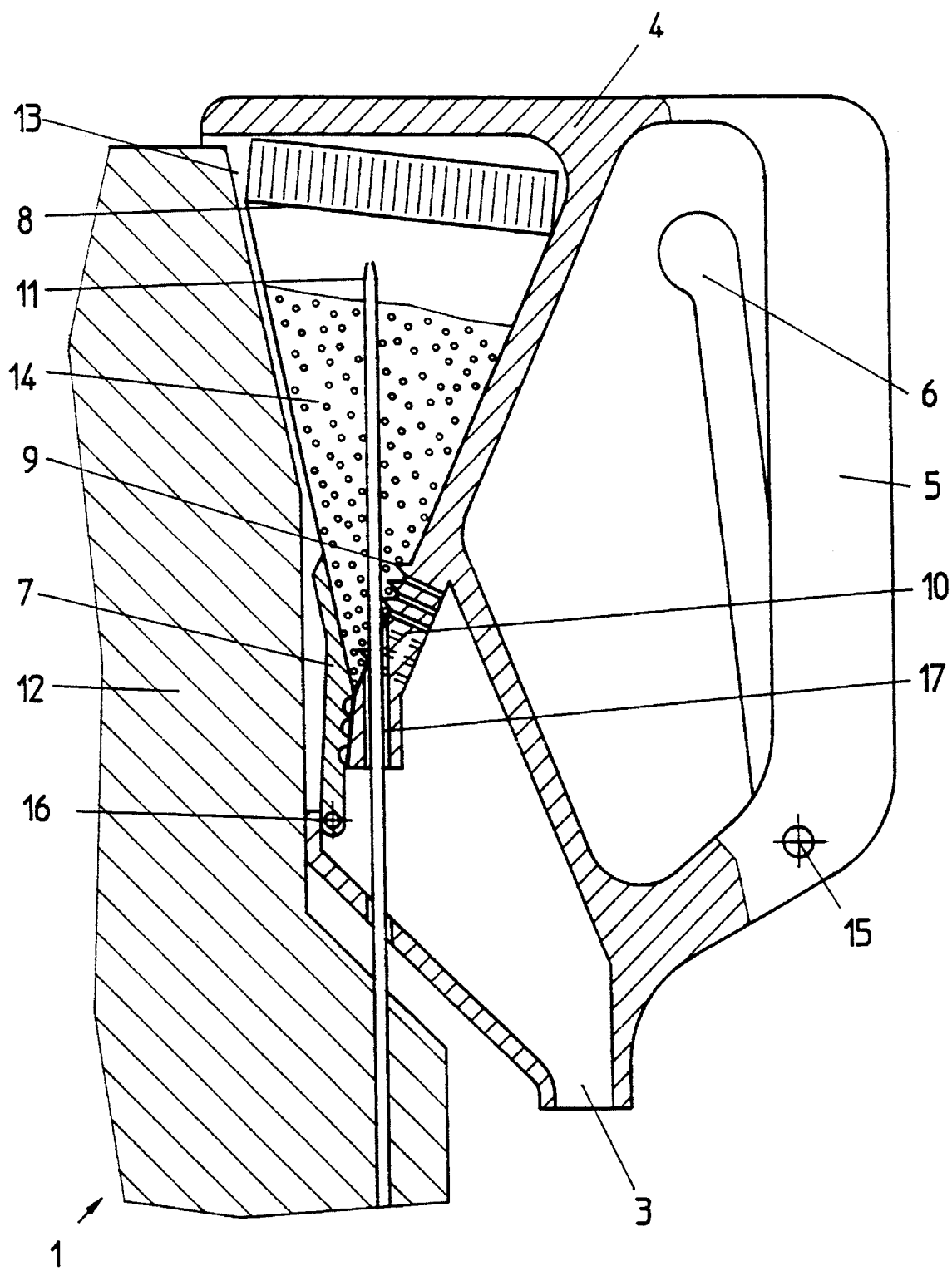
FIG. 4 is a partial section of FIG. 2 along the axis A—A and representing the device for extraction from a bag.

Referring to FIG. 4, the bag, represented by way of example, has the shape of a tetrahedron with upper and lower welds arranged in a perpendicular plane. The handle 5 of the bag-holder has a trigger 6 pivoting about the axis 15, which makes it possible to operate the clamp 7 which clamps the lower border of the bag 8 against a first portion of the housing of the bag-holder 4 which contains bore 17 which passes therethrough for passage through the bag-holder housing for communication of the bore with the cavity formed by the interior surface of the housing. A second portion of the bag-holder housing extends from the first portion of the bag-holder housing. The clamp 7 opens by pivoting about the axis 16 in order to enable the bag to be put into place or to be removed. The bag is filled with a substance 14 to be extracted. Raised and indented elements 9 placed on an outflow grid 10, integral with the bag-holder 4, of the housing second portion project into the housing cavity which communicates with the outflow channel 3 via flow holes positioned in the raised and indented grid area of the housing second portion. The injection needle 11, integral with the machine 1, penetrates at the base of the bag 8 through a bore 17 provided at the bottom of the bag-holder and emerges into the upper part of the said bag.

A complementary part 12, integral with the machine 1, creates, with the bag-holder 4, a sealed housing 13 substantially matching the external shape of the bag.

We claim:

1. Apparatus for holding a bag containing a substance for preparation of a beverage for extraction of the substance comprising:

a housing member which comprises first and second portions wherein the housing member second portion extends from the housing member first portion and has a wall surface which defines a cavity for containing a bag, wherein the bag has a linear edge weld portion and contains a substance for preparation of a beverage, wherein the housing member second portion is configured for containing the bag so that when the bag is contained by the housing member second portion, the linear edge weld portion is positioned adjacent the housing member first portion and wherein the housing member first portion contains a bore which passes therethrough so that the bore communicates with the cavity;

means positioned for, upon containment of a bag by the housing member second portion, securing the linear edge weld portion against the housing member first portion;

raised members which extend from the housing member second portion wall surface into the cavity at a position adjacent the housing member first portion for defining a grid area of raised and indented portions for tearing a bag contained by the housing member second portion and flow holes positioned in the grid area which pass through the housing member second portion for, upon tearing of a bag by the raised members, passing extract from the cavity through the housing member; and a handle which extends from the housing member second portion.

2. Apparatus according to claim 1 wherein the securing means comprises a clamping member and a pivot member assembly configured so that the clamping member is pivotable about the pivot member towards and away from the housing member first portion.

3. Apparatus according to claim 2 wherein the pivot member is engaged with a further member which is configured to form an outflow duct and which is connected with the handle.

4. Apparatus according to claim 3 further comprising a second pivot member engaged with the outflow duct member and further comprising a trigger assembly connected with the second pivot member and the handle so that upon movement of the trigger assembly, the outflow duct member is pivoted to pivot the clamping member for pivoting the clamping member towards and away from the housing member first portion.

5. Apparatus according to claim 4 wherein the trigger assembly comprises a spring-loaded trigger finger.

6. Apparatus according to claim 1 wherein the handle has members which extend from the housing member second portion to a handle gripping portion wherein one of the handle members extends from the housing member second portion at a position so that the flow holes are positioned between the one handle member and the housing member first portion.

7. Apparatus according to claim 1 further comprising a hollowed needle member which extends through the housing member first portion bore into the cavity and which is removable from the bore.

8. Apparatus for extraction of a substance contained in a bag comprising:

a bag holder comprising a housing comprising:

a housing member which comprises first and second portions wherein the housing member second portion extends from the housing member first portion and has a wall surface which defines a cavity for containing a bag, wherein the bag has a linear edge weld portion and contains a substance for preparation of a beverage, wherein the housing member second portion is configured for containing the bag so that when the bag is contained by the housing member second portion, the linear edge weld portion is positioned adjacent the housing member first portion and wherein the housing member first portion contains a bore which passes therethrough so that the bore communicates with the cavity;

means positioned for, upon containment of a bag by the housing member second portion, securing the linear edge weld portion against the housing member first portion;

raised members which extend from the housing member second portion wall surface into the cavity at a position adjacent the housing member first portion for defining a grid area of raised and indented portions for tearing a bag contained by the housing member second portion and flow holes positioned in the grid area which pass through the housing member second portion for, upon tearing of a bag by the raised members, passing extract from the cavity through the housing member; and a handle which extends from the housing member second portion; and an extraction machine member for providing an extraction fluid and comprising a part for supporting the bag-holder device and comprising a needle member which extends from the machine member and which is positioned for delivery of extraction fluid to within the bag-holder housing member cavity.

9. Apparatus according to claim 8 wherein the securing means comprises a clamping member and a pivot member assembly configured so that the clamping member is pivotable about the pivot member towards and away from the housing member first portion.

10. Apparatus according to claim 9 wherein the pivot member is engaged with a further member configured to form an outflow duct and connected with the handle.

11. Apparatus according to claim 10 further comprising a second pivot member engaged with the outflow duct member and further comprising a trigger assembly connected with the second pivot member and the handle so that upon movement of the trigger assembly, the outflow duct member is pivoted to pivot the clamping member for pivoting the clamping member towards and away from the housing member first portion.

12. Apparatus according to claim 11 wherein the trigger assembly comprises a spring-loaded trigger finger.

13. Apparatus according to claim 8 wherein the housing member and the machine member have borders configured for placement together and further comprising seals positioned for, upon placement of the housing member and machine member together, sealing the borders.

* * * * *

UNITED STATES PATENT AND TRADEMARK OFFICE
CERTIFICATE OF CORRECTION

PATENT NO. : 5,603,254
DATED : February 18, 1997
INVENTOR(S) : Olivier FOND, et al.

It is certified that error appears in the above-identified patent and that said Letters Patent is hereby corrected as shown below:

On the title page, under the heading "[22] PCT Filed",

"Mar. 27, 1994" should be --May 27, 1994--.

Signed and Sealed this

Twenty-seventh Day of May, 1997

Attest:

BRUCE LEHMAN

Attesting Officer     Commissioner of Patents and Trademarks